(12) United States Patent
Wu

(10) Patent No.: US 7,752,807 B2
(45) Date of Patent: Jul. 13, 2010

(54) WATERING DEVICE

(76) Inventor: Yu-Jui Wu, 3rd Fl., No. 437, Niou Pu Rd., Hsin Chu City (TW)

( * ) Notice: Subject to any disclaimer, the term of this patent is extended or adjusted under 35 U.S.C. 154(b) by 283 days.

(21) Appl. No.: 11/879,288

(22) Filed: Jul. 17, 2007

(65) Prior Publication Data

US 2008/0017728 A1 Jan. 24, 2008

(30) Foreign Application Priority Data

Jul. 24, 2006 (TW) .............................. 95127014 A

(51) Int. Cl.
*A01G 29/00* (2006.01)
(52) U.S. Cl. ...................................................... 47/48.5
(58) Field of Classification Search .................. 47/48.5, 47/79, 40.5; 137/215; 251/215, 216
See application file for complete search history.

(56) References Cited

U.S. PATENT DOCUMENTS

| | | | | |
|---|---|---|---|---|
| 1,478,584 A * | 12/1923 | Schweinert | ................. | 137/223 |
| 3,255,775 A * | 6/1966 | Albro et al. | ................. | 137/553 |
| 3,724,488 A * | 4/1973 | Featherstone | ............... | 137/223 |
| 3,820,564 A * | 6/1974 | Wagner | ....................... | 137/880 |
| 5,306,187 A * | 4/1994 | Mackal | ......................... | 441/41 |
| 5,580,101 A * | 12/1996 | Fisher et al. | ................... | 285/40 |
| 6,557,825 B2 * | 5/2003 | Stone et al. | ................. | 251/152 |
| 6,684,563 B2 * | 2/2004 | Wu | ............................. | 47/48.5 |
| 6,910,673 B2 * | 6/2005 | Green et al. | ................. | 251/118 |

* cited by examiner

*Primary Examiner*—Michael R Mansen
*Assistant Examiner*—Monica L Williams
(74) *Attorney, Agent, or Firm*—Pro-Techtor Int'l Services; Ralph Willgehs

(57) ABSTRACT

An improved watering device comprises a cap member including a fastening portion provided at the upper side thereof for screwing with a container, and including a hollow tapered insertion element couplingly disposed at the lower side thereof and communicating with the fastening portion for forming a water passageway therein, and the cap member containing an air flowing duct extending in the air venting end of the cap member and having an air admitting end formed at the outer portion thereof for screwing with a rotating knob, wherein the air admitting end of the air flowing duct includes a tapered outer thread portion attached thereon so that as screwing with the rotating knob, an air admitting sacs between the inner and outer thread portions may be formed, thereby the outside air may flow into the air flowing duct, any by using the control member, the outflow amount of fluid may be stably regulated.

12 Claims, 12 Drawing Sheets

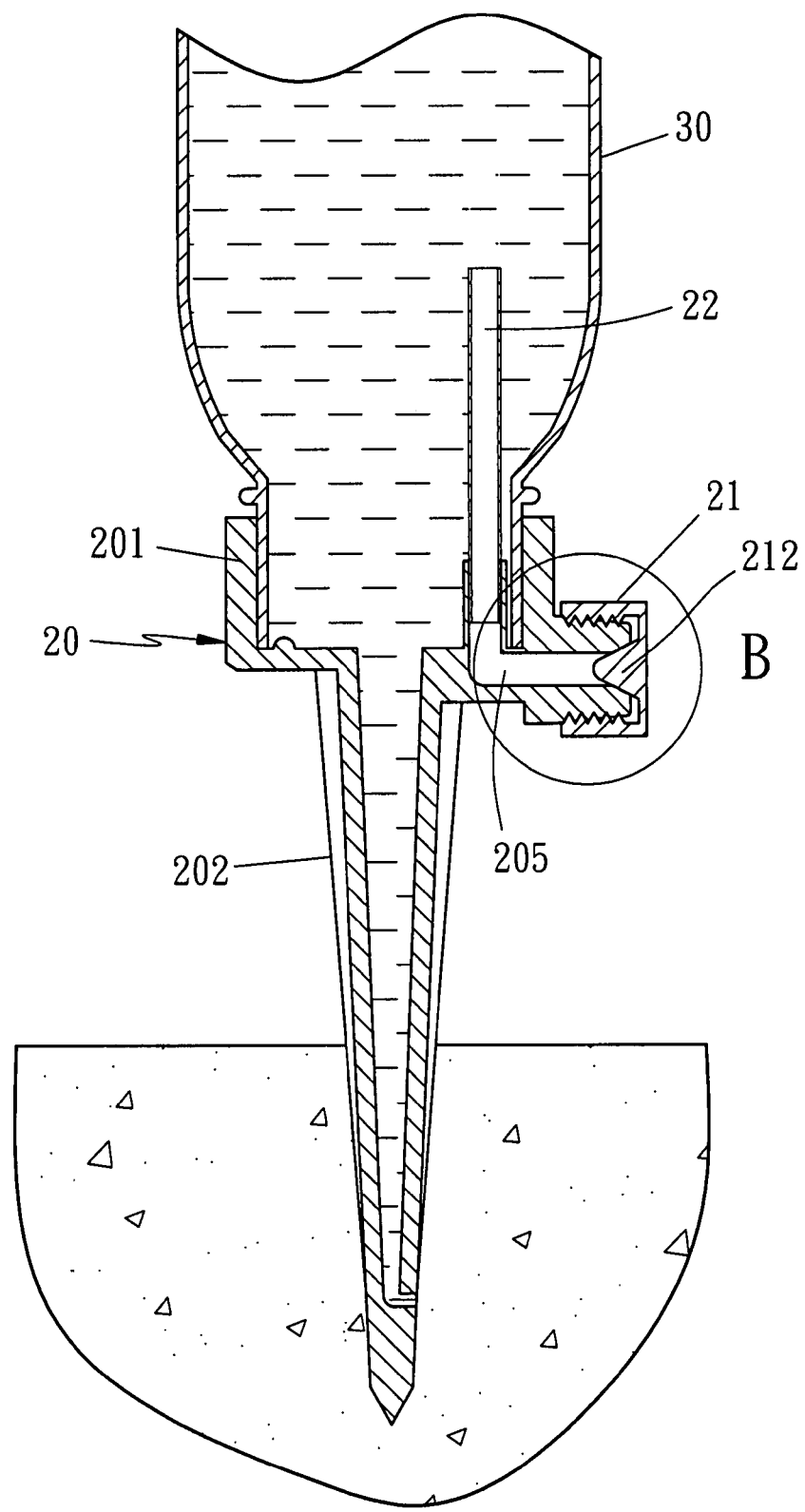
F I G . 5

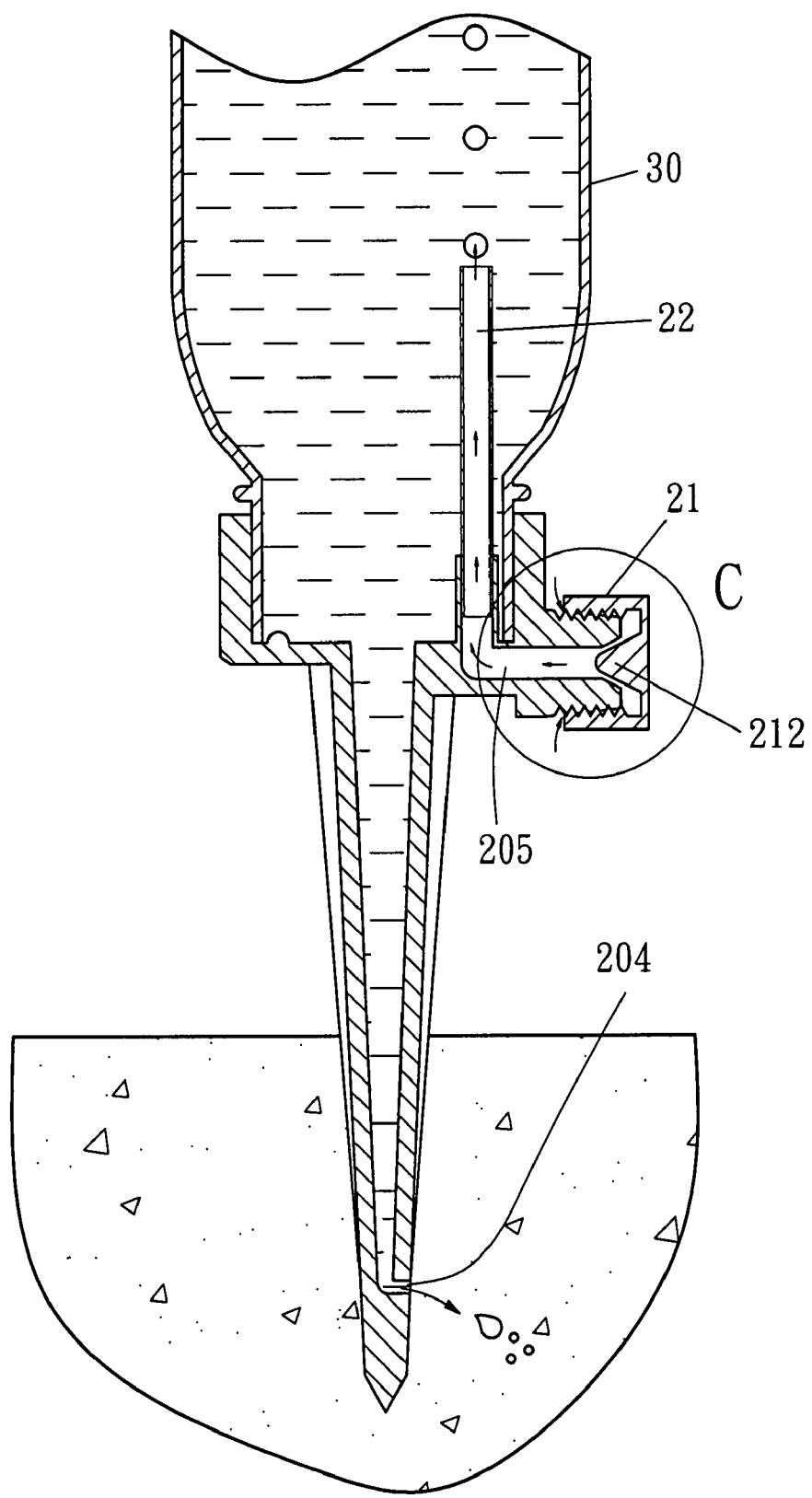
F I G. 7

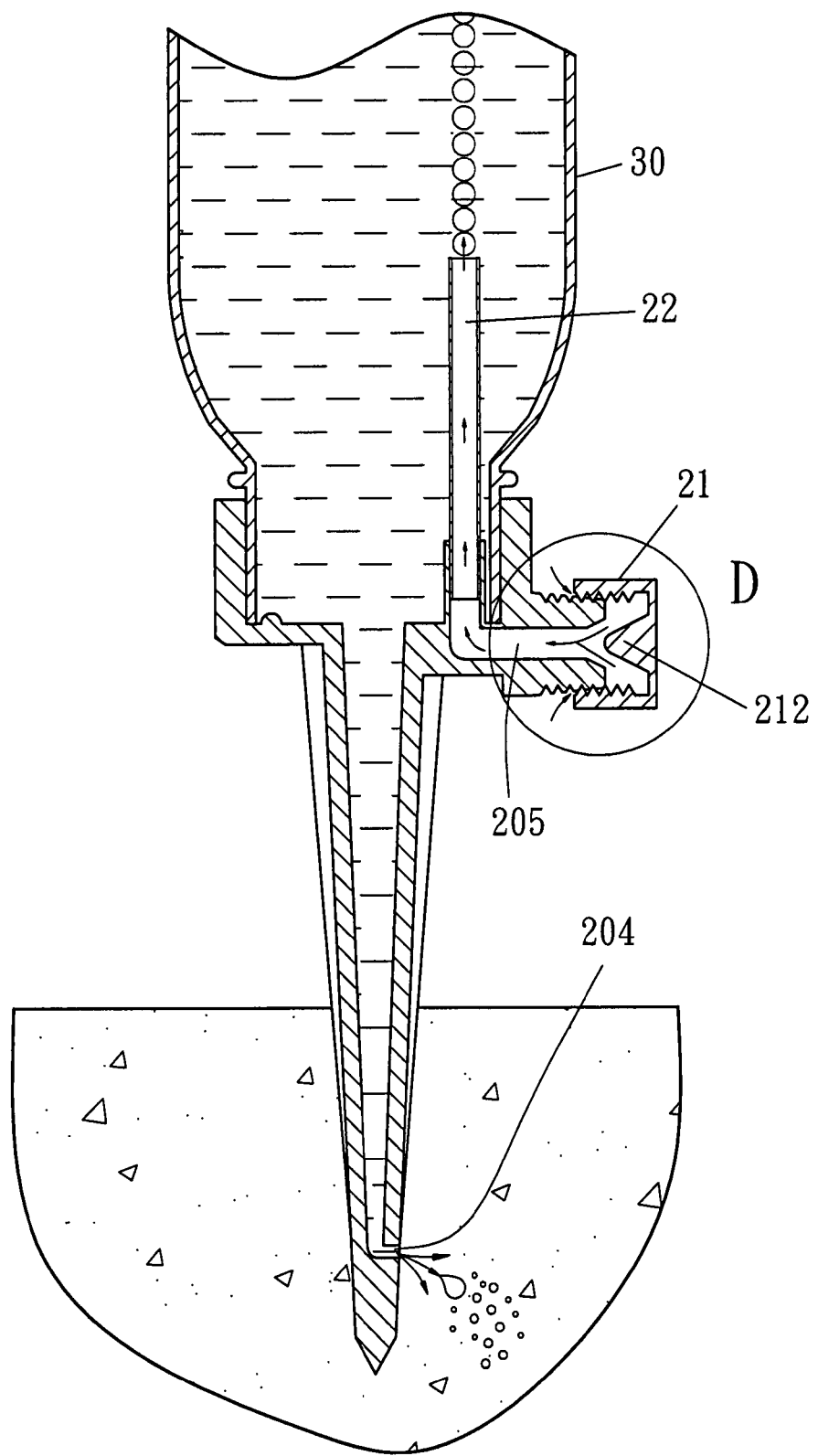
F I G . 9

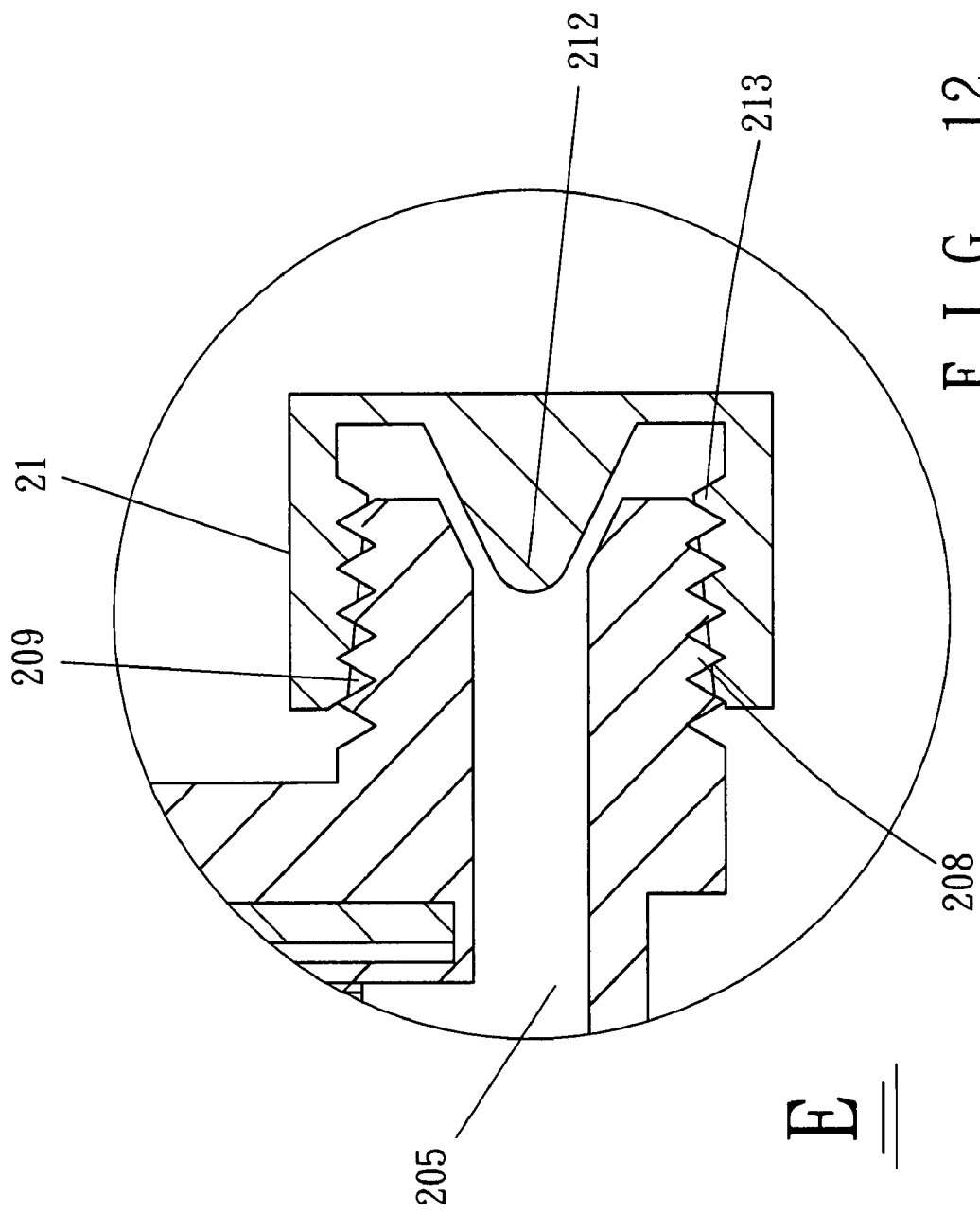

WATERING DEVICE

BACKGROUND OF THE INVENTION

1. Field of the Invention

The present invention relates to an improved watering device that the outflow amount of fluid may be stably regulated.

2. Description of the Prior Arts

Referring to FIGS. 1 and 2, a prior art watering device disclosed in U.S. Pat. No. 6,684,563 comprises a cap member 10, a control knob 11 and an air tube 12. The cap member 10 includes a tapered insertion 102 having a channel 103 therein and a discharging 104 provided at the lower side thereof, and includes an air duct 105 having outer threads thereon disposed at one side thereof. The air duct 105 involves a passageway 106 for the communication with the cap member 10 and for the insertion of the air tube 12 arranged therein, and includes a control knob 11 having a tapered control block 111 thereon screwed at the front end thereof. The control knob 11 includes a ventilation hole 112 for communicating with the interior thereof. During the operation, a container 13 filled with fluid is screwed with the cap member 10, and the air tube 12 is inserted into the container 13. By inserting the tapered insertion 102 of the cap member 10 into the soil of the potted plant and then rotating the control knob 11, the clearance between the control block 111 of the control knob 11 and the air duct 106 of the air duct 105 may be adjustable for stably flowing the air in from the ventilation hole 112, and then flowing into the container 13 through the air duct 106 to increase the pressure, thereby the fluid in the container 13 may flows out from the discharging hole 104 for being absorbed by the soil of the potted plant.

However, such a prior art watering device still has the following defects:

1. Because the control knob 11 is plastically rejection formed for mass production, and the bore diameter of the ventilation hole 112 is quite tiny, the mold is easy to be broken to cause a higher maintenance cost.

2. The ventilation hole 112 is easy to be jammed to result in a poor fluid supply, and the fluid supply of the prior art watering device is difficult to regulate.

The present invention has arisen to mitigate and/or obviate the afore-described disadvantages.

SUMMARY OF THE INVENTION

The primary object of the present invention is to provide an improved watering device that comprises a cap member including a fastening portion provided at the upper side thereof for screwing with a container, and including a hollow tapered insertion element couplingly disposed at the lower side thereof and communicating with the fastening portion for forming a water passageway therein, and the cap member containing an air flowing duct extending in the air venting end of the cap member and having an air admitting end formed at the outer portion thereof for screwing with a rotating knob, wherein the air admitting end of the air flowing duct includes a tapered outer thread portion attached thereon so that as screwing with the rotating knob, an air admitting sacs between the inner and outer thread portions may be formed, thereby the outside air may flow into the air flowing duct, and by using the control member, the outflow amount of fluid may be stably regulated.

The secondary object of the present invention is to provide an improved watering device, the air admitting end of the air flowing duct of which includes a tapered outer thread portion attached thereon so that as screwing with the rotating knob, an air admitting sacs between the inner and outer thread portions may be formed, thereby maintaining the formed mold for making the ventilation hole.

Another object of the present invention is to provide an improved watering device, the cap member of which contains an air flowing duct disposed at the side thereof and extending in the air venting end thereof, is used for the insertion of an air venting tube, the top end of which is lower than the level of the air venting tube, such that the bubble brings about on the top of the venting tube and floats on the level of fluid to increase the pressure in the container, discharging fluid from the outlet 204. Thereby, the discharging amount of fluid may be adjustable based on the bubble quantity.

The present invention will become more obvious from the following description when taken in connection with the accompanying drawings, which show, for purpose of illustrations only, the preferred embodiment in accordance with the present invention.

BRIEF DESCRIPTION OF THE DRAWINGS

FIG. 5 is a cross sectional diagram illustrating the operation of the improved watering device according to the present invention;

FIG. 7 is another cross sectional diagram illustrating the operation of the improved watering device according to the present invention;

FIG. 9 is another cross sectional diagram illustrating the operation of the improved watering device according to the present invention

FIG. 12 is an enlarged diagram of portion E of FIG. 11.

DETAILED DESCRIPTION OF THE PREFERRED EMBODIMENT

Figure 1:
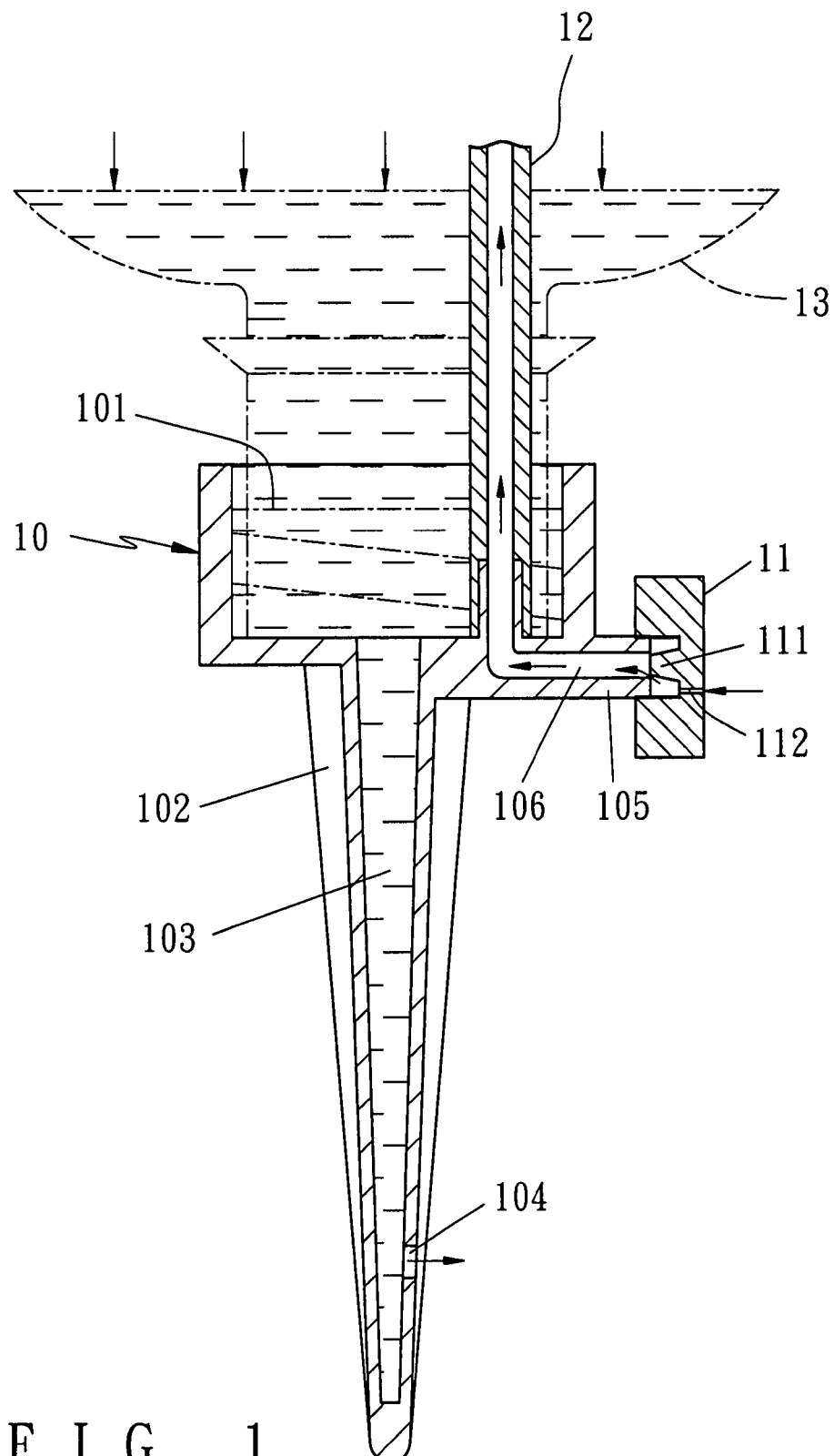
FIG. 1 is a cross sectional diagram illustrating the operation of U.S. Pat. No. 6,684,563.
Figure 2:
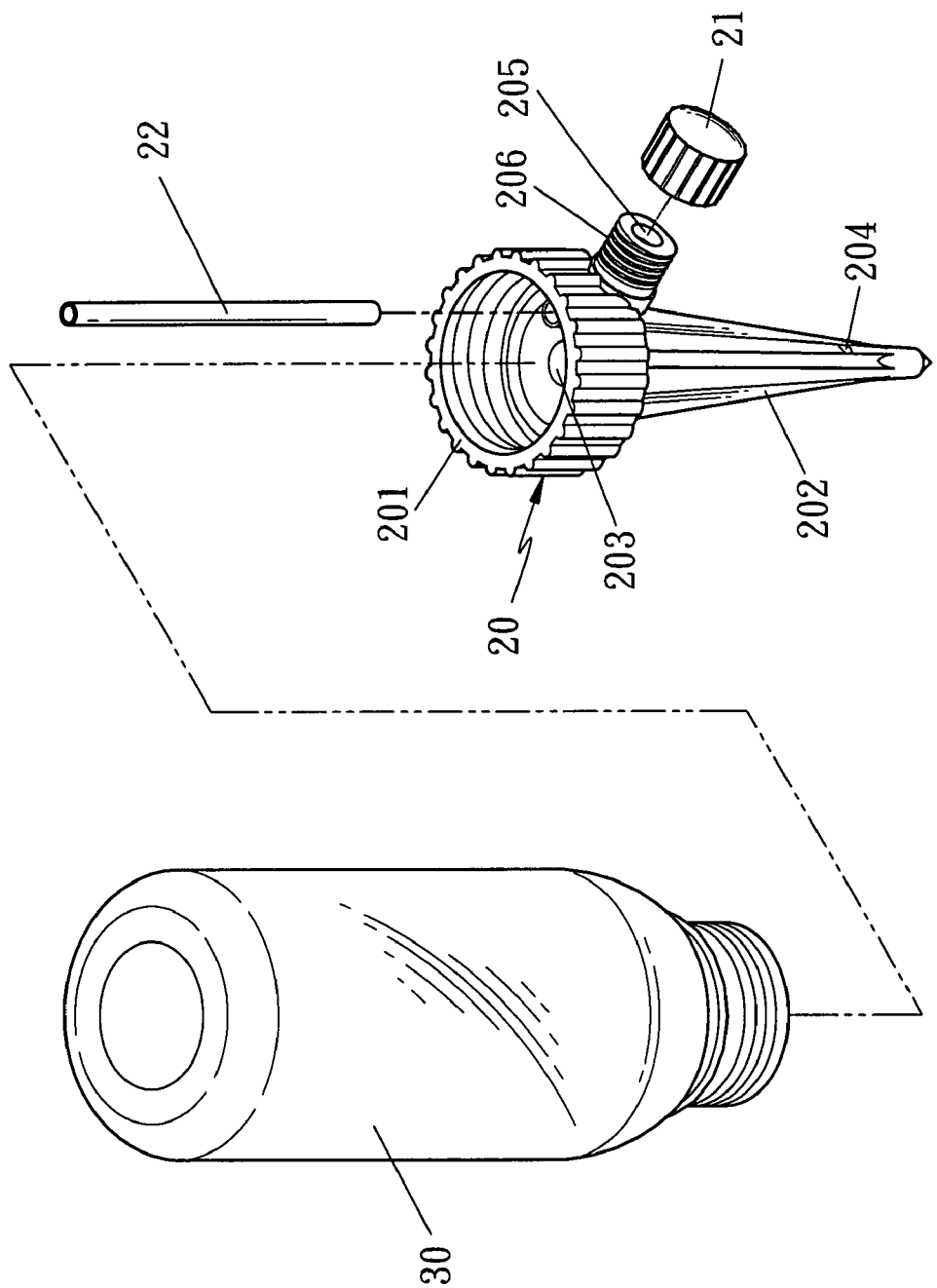
FIG. 2 is a perspective diagram illustrating the exploded components of an improved watering device according to the present invention.
Figure 3:
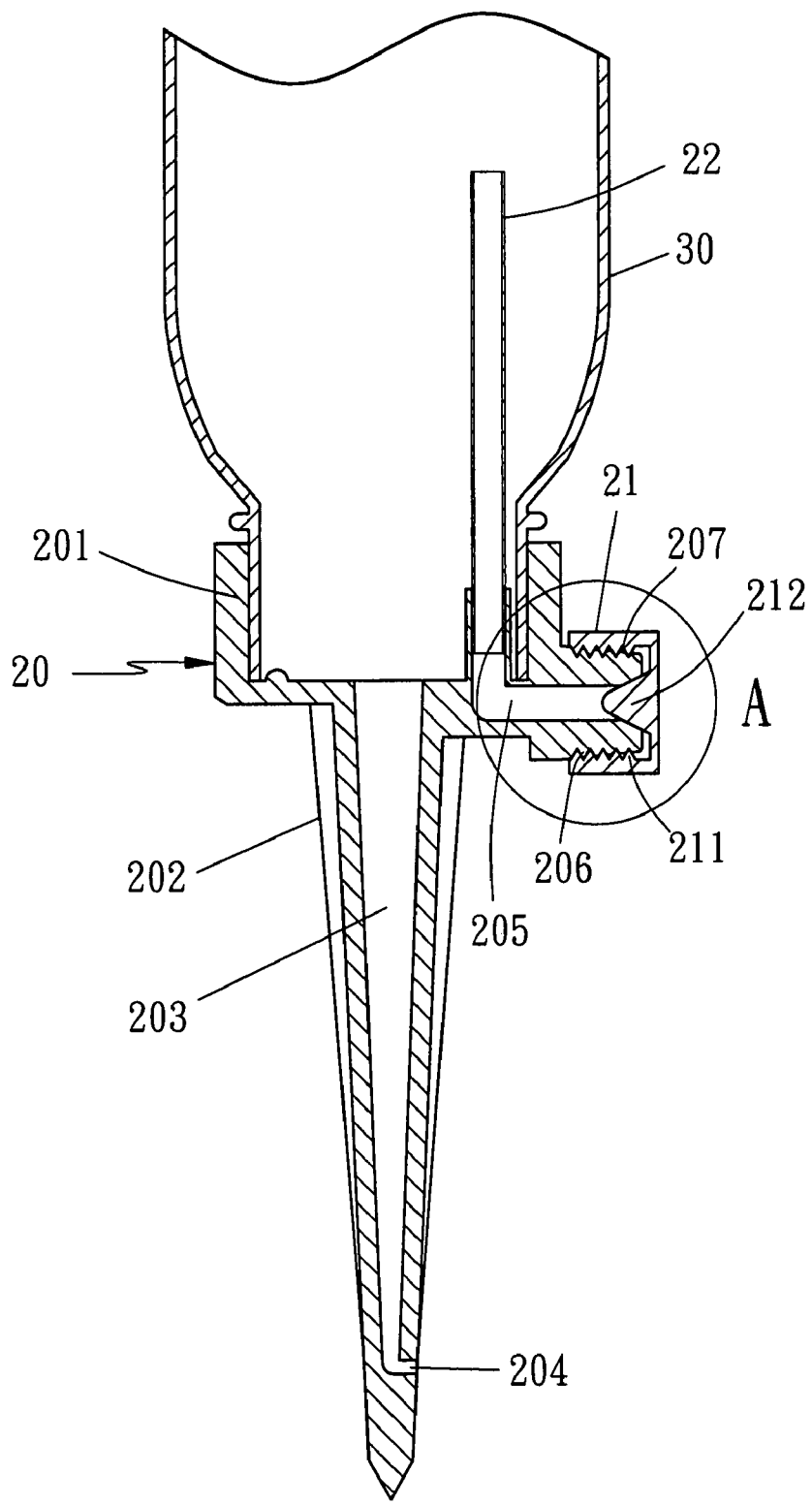
FIG. 3 is an assembly cross sectional diagram of the improved watering device according to the present invention.
Figure 4:
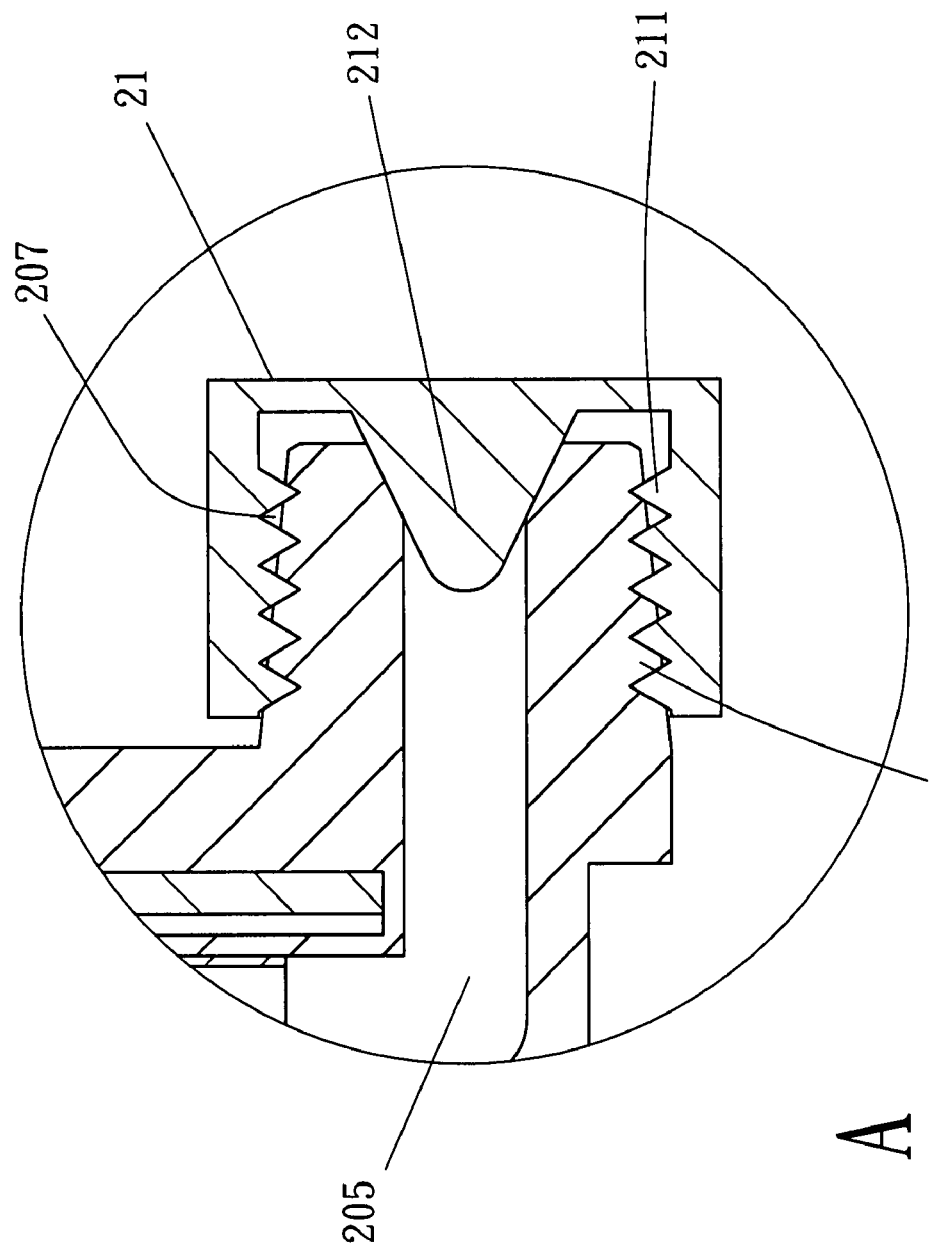
FIG. 4 is an enlarged diagram of portion A of FIG. 3.

Referring to FIGS. 2-4, an improved watering device in accordance with the present invention comprises a cap member 20 including a fastening portion 201 provided at the upper side thereof and having inner threads formed therein for screwing with a container 30, and including a hollow tapered insertion element 202 couplingly disposed at the lower side thereof and communicating with the fastening portion 201 for forming a water passageway 203 therein. The insertion element 202 involves an outlet 204 arranged adjacent to the bottom thereof so that as the insertion element 202 is inserted into soil, the outlet 204 may be located in soil. The cap member 20 contains an air flowing duct 205 mounted at the side thereof and extending in the air venting end of the cap member 20 for the insertion of an air venting tube 22, and includes a tapered outer thread portion 206 fixed on the outer portion thereof, for screwing with a rotating knob 21. The rotating knob 21 includes a parallel inner thread portion 211 and tapered controlling member 212 both attached therein so that as the air admitting end of the air flowing duct 205 screws with the rotating knob 21, an air admitting sacs 207 between the inner and outer thread portions 211 and 206 may be formed.

Figure 6:
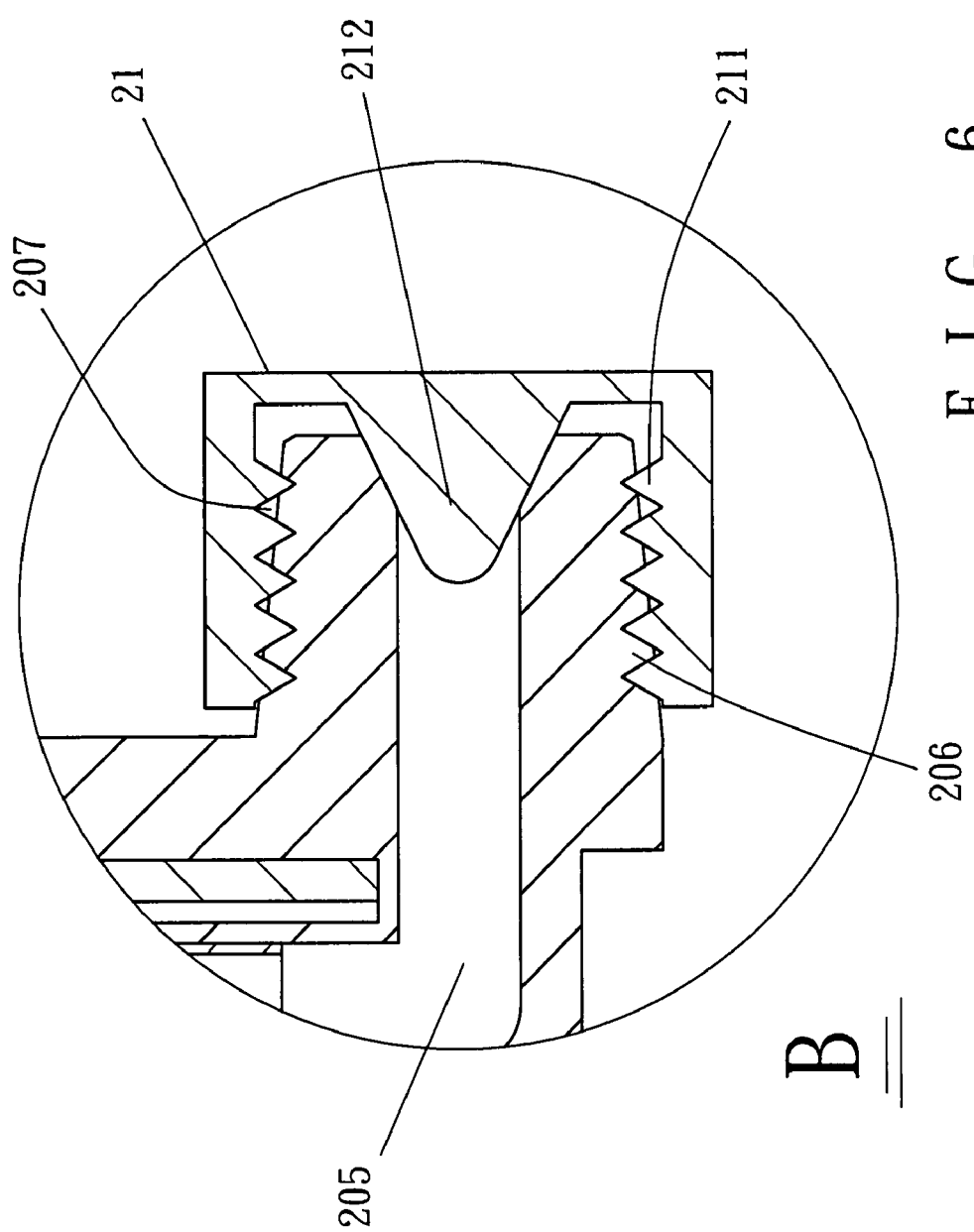
FIG. 6 is an enlarged diagram of portion B of FIG. 5.

In assembly, as shown in FIGS. 5 and 6, a container 30 filled with fluid therein is screwed with the fastening portion 201 of the cap member 20, and then by using the insertion element 202, the water device is inserted into the soil of potted plant and the lever of fluid in the container 30 is higher than the top end of the air venting tube 22. While the air admitting sacs 207 is used for flowing air inward from outside, the controlling member 212 of the rotating knob 21 matingly engages with the air flowing duct 205, hence the air may not flow into the container 30 to cause a negative pressure, thus not discharging the fluid.

Figure 8:
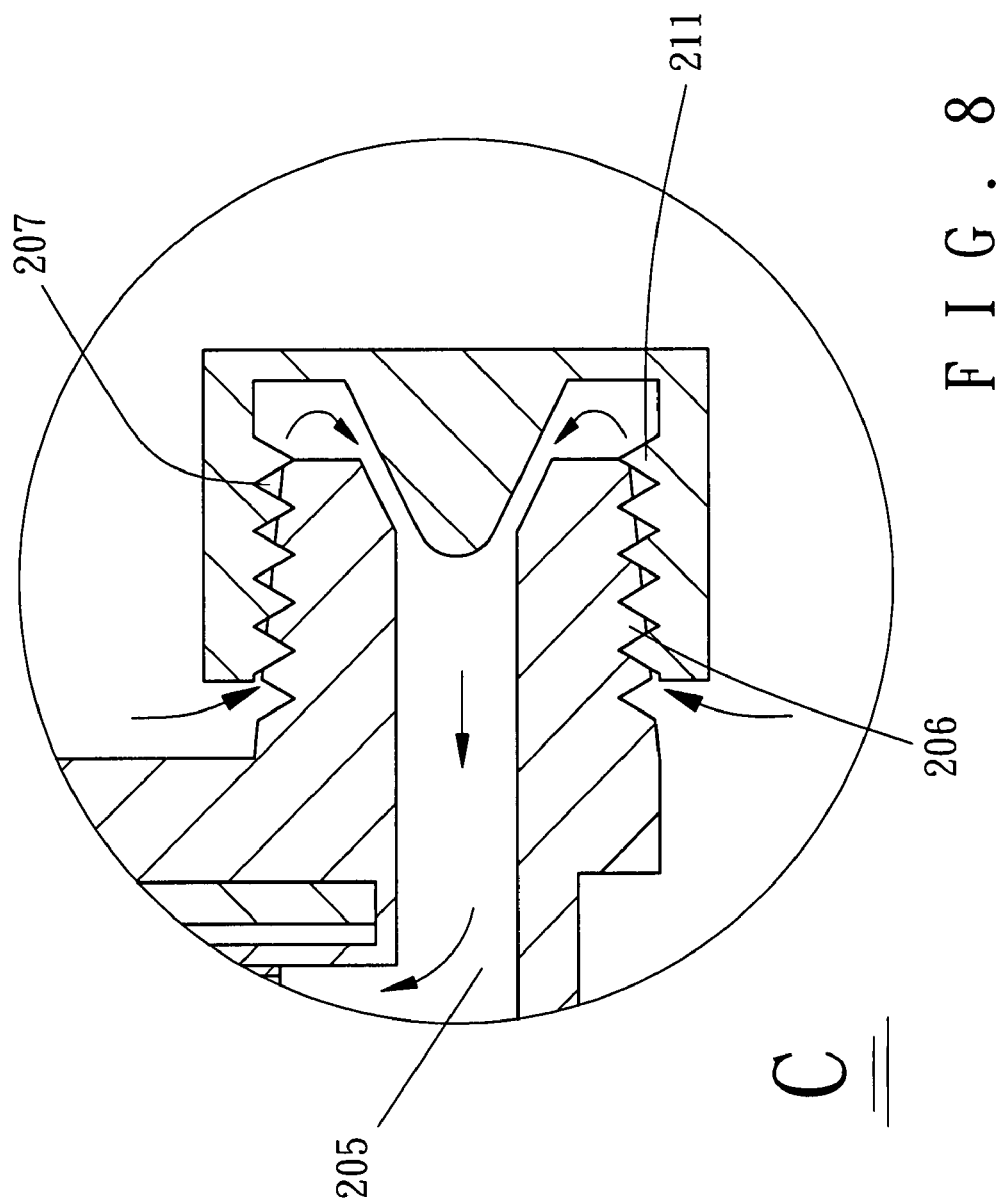
FIG. 8 is an enlarged diagram of portion C of FIG. 7.

With reference to FIGS. 7 and 8, after slightly rotating the rotating knob 21, the controlling member 212 disengages from the air flowing duct 205, forming a tiny opening therebetween. Thereafter, the air admitting sacs 207 may lead outside air to flow into the air flowing duct 205 and the air venting tube 22, then a small amount of bubble brings about on the top of the venting tube 22 and floats on the level of fluid to increase the pressure in the container 30, discharging fluid in a small quantity from the outlet 204. Thereby, the discharging amount of fluid may be adjustable based on the bubble quantity.

Figure 10:
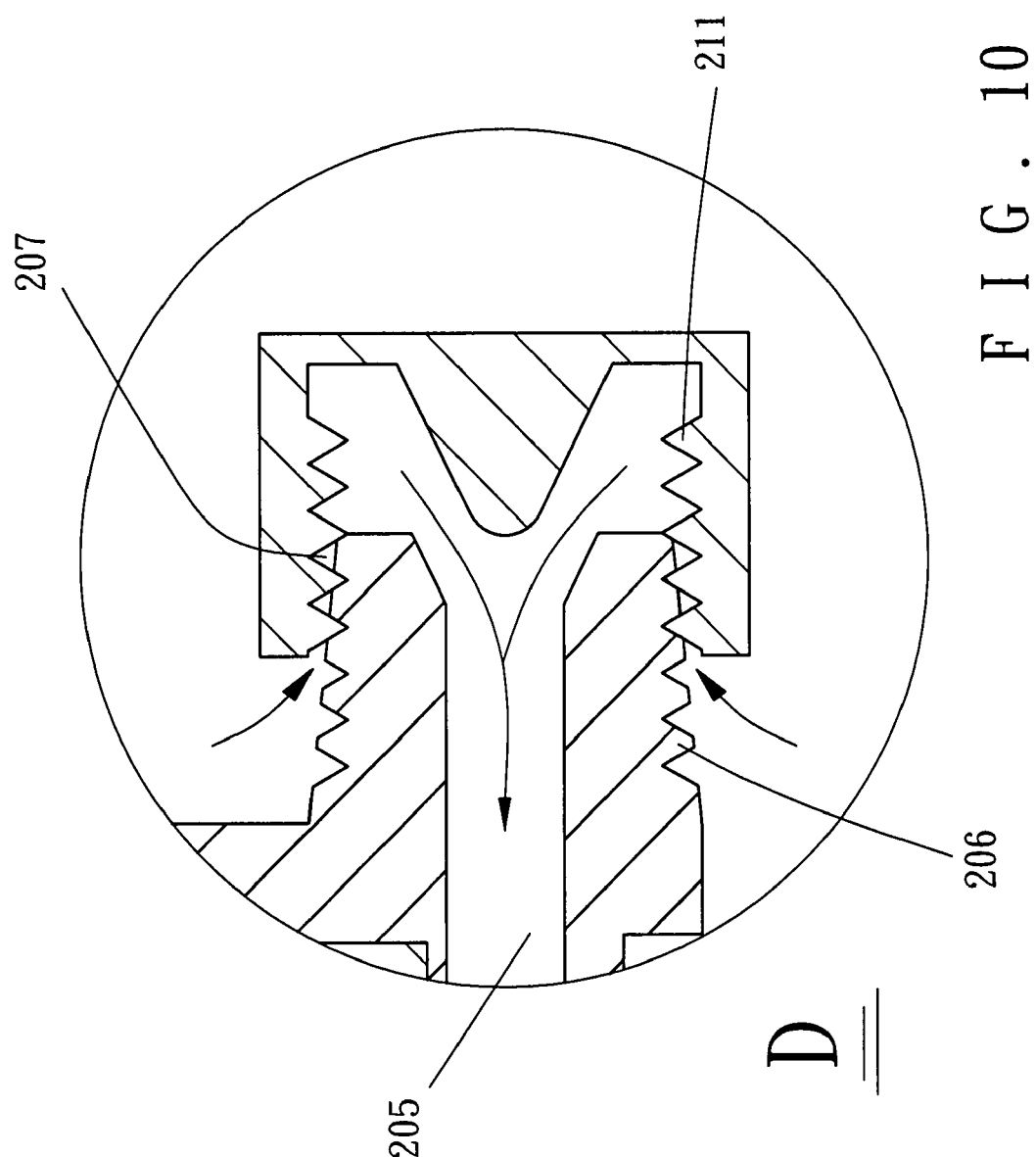
FIG. 10 is an enlarged diagram of portion D of FIG. 9.

With reference to FIGS. 9 and 10, keeping on rotating the rotating knob 21, the controlling member 212 further disengages from the air flowing duct 205, forming a larger opening therebetween. Thereafter, the air admitting sacs 207 may greatly lead outside air to flow into the air flowing duct 205 and the air venting tube 22, then a large amount of bubble occurs on the top of the venting tube 22 and floats on the level of fluid to increase the pressure in the container 30, discharging fluid in a large quantity from the outlet 204. Thereby, the larger discharging amount of fluid may be obtained.

Figure 11:
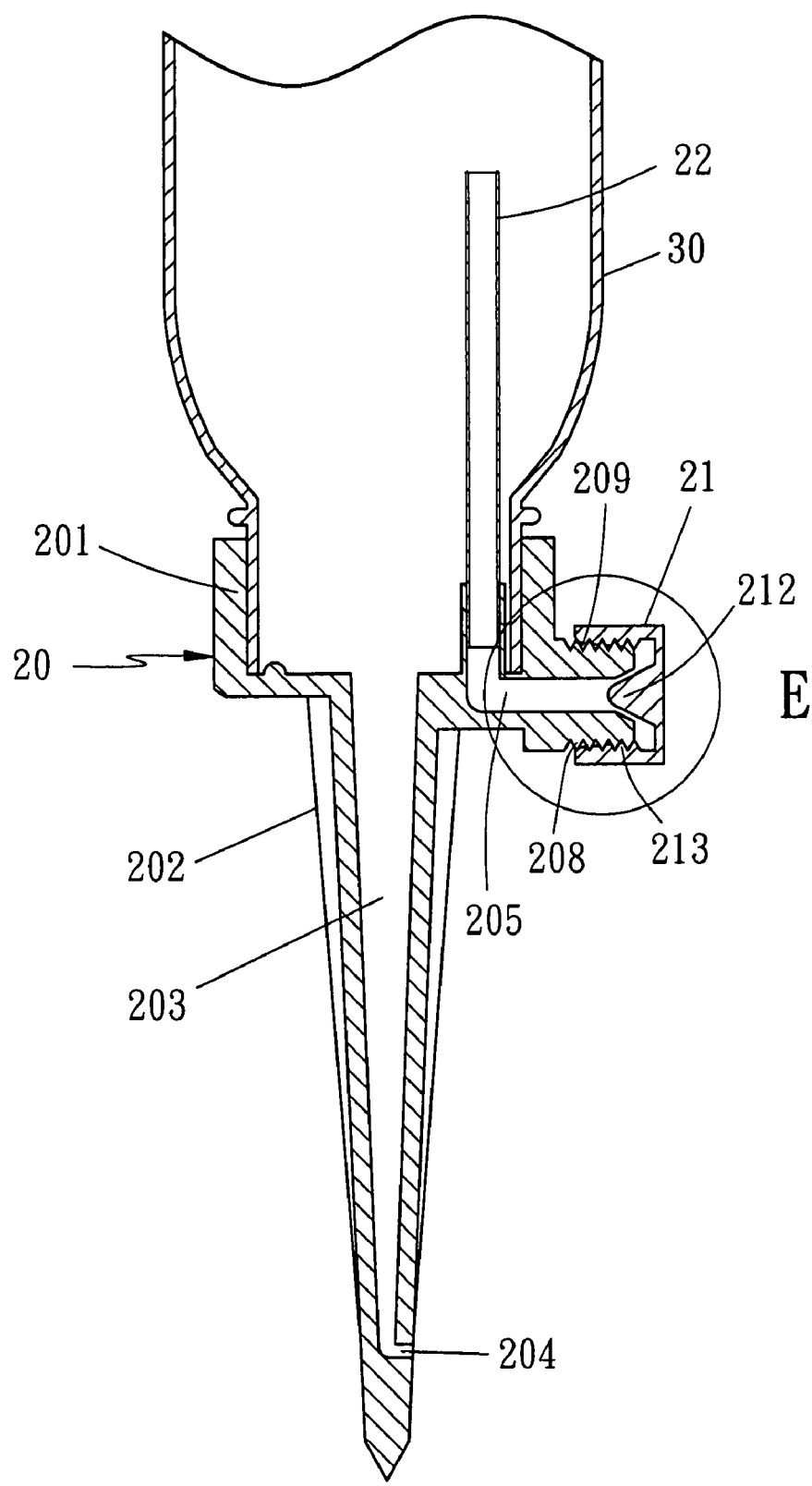
FIG. 11 is an assembly cross sectional diagram of the improved watering device according to another embodiment of the present invention.

Referring further to FIGS. 11 and 12, in another embodiment of the present invention, the control knob 21 includes an inner thread segment 213 arranged therein, and the cap member 20 includes an outer thread segment 208 parallelly provided at the air admitting end thereof such that as the air admitting end of the air flowing duct 205 screws with the rotating knob 21, an interspace between the inner and outer thread segments 213, 208 will result in to form an air admitting sacs 209 for flowing air in. Thereby, air may flow in the air flowing dust 205 through the air admitting sacs 209, discharging fluid from the outlet 204.

The invention is not limited to the above embodiment but various modifications thereof may be made. It will be understood by those skilled in the art that various changes in form and detail may made without departing from the scope and spirit of the present invention.

What is claimed is:

1. An improved watering device comprising:
a cap member including a fastening portion provided at the upper side thereof for screwing with a container, and including a hollow tapered insertion element couplingly disposed at the lower side thereof and communicating with said fastening portion for forming a water passageway therein, and said cap member containing an air flowing duct extending in the air venting end of said cap member and having an air admitting end formed at the outer portion thereof for screwing with a rotating knob, wherein the air admitting end of said air flowing duct includes a tapered outer thread portion attached thereon so that as screwing with said rotating knob, an air admitting sacs between said inner and outer thread portions may be formed.

2. The improved watering device as claimed in claim 1, wherein said fastening portion of said cap member includes inner threads formed therein for screwing with said container.

3. The improved watering device as claimed in claim 1, wherein said insertion element involves an outlet arranged adjacent to the bottom thereof.

4. The improved watering device as claimed in claim 1, wherein said air flowing duct extends in the air venting end of said cap member for the insertion of an air venting tube.

5. The improved watering device as claimed in claim 1, wherein the top end of said air venting tube is lower than the lever of fluid in said container.

6. The improved watering device as claimed in claim 1, wherein said rotating knob includes a tapered controlling member attached therein.

7. An improved watering device comprising:
a cap member including a fastening portion provided at the upper side thereof for screwing with a container, and including a hollow tapered insertion element couplingly disposed at the lower side thereof and having an outlet for forming a water passageway therein, and further including an air flowing duct arranged at the side thereof, the air venting end of which extends into said cap member, and the air admitting end of said cap member screwing with a rotating knob, wherein said rotating knob includes a tapered inner thread segment arranged therein so that as screwing with the air admitting end of said cap member, an interspace between said inner and outer thread segments may occur to form an air admitting sacs.

8. The improved watering device as claimed in claim 7, wherein said fastening portion of said cap member includes inner threads formed therein for screwing with said container.

9. The improved watering device as claimed in claim 7, wherein said insertion element involves an outlet arranged adjacent to the bottom thereof.

10. The improved watering device as claimed in claim 7, wherein said air flowing duct extends in the air venting end of said cap member for the insertion of an air venting tube.

11. The improved watering device as claimed in claim 7, wherein the top end of said air venting tube is lower than the lever of fluid in said container.

12. The improved watering device as claimed in claim 7, wherein said rotating knob includes a tapered controlling member attached therein.

* * * * *